(12) United States Patent
Romero

(10) Patent No.: US 9,948,403 B1
(45) Date of Patent: Apr. 17, 2018

(54) NETWORK FIBER OPTIC CABLE CONNECTOR WITH MAGNETIC CONTACTS

(71) Applicant: INTERNATIONAL BUSINESS MACHINES CORPORATION, Armonk, NY (US)

(72) Inventor: Edward A. Romero, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/445,396

(22) Filed: Feb. 28, 2017

(51) Int. Cl.
*H04B 10/00* (2013.01)
*H04B 10/80* (2013.01)
*G02B 6/38* (2006.01)
*G02B 6/42* (2006.01)
*G02B 6/44* (2006.01)

(52) U.S. Cl.
CPC ......... *H04B 10/801* (2013.01); *G02B 6/3893* (2013.01); *G02B 6/428* (2013.01); *G02B 6/443* (2013.01)

(58) Field of Classification Search
CPC .. G02B 6/4246; G02B 6/4292; G02B 6/3893; G02B 6/3897; G02B 6/4261; G02B 6/428; G02B 6/4284; H04B 10/27; H04L 12/66
USPC ........................................................ 398/116
See application file for complete search history.

(56) References Cited

U.S. PATENT DOCUMENTS

| | | | |
|---|---|---|---|
| 4,690,495 A | 9/1987 | Giannini | |
| 7,484,899 B2 | 2/2009 | Chan et al. | |
| 7,824,113 B2 | 11/2010 | Wang et al. | |
| 8,727,793 B2 | 5/2014 | Cafiero et al. | |
| 2014/0098492 A1* | 4/2014 | Lam | H05K 7/20727 361/692 |
| 2014/0120746 A1 | 5/2014 | Persion et al. | |
| 2015/0201528 A1 | 7/2015 | Lebo et al. | |
| 2016/0020911 A1 | 1/2016 | Sipes, Jr. et al. | |
| 2016/0197736 A1 | 7/2016 | Shvarzberg et al. | |
| 2016/0299300 A1* | 10/2016 | Lavoie | G02B 6/4246 |
| 2017/0279236 A1* | 9/2017 | Chen | G02B 6/3887 |
| 2017/0288770 A1* | 10/2017 | Mentovich | H04B 10/0795 |

FOREIGN PATENT DOCUMENTS

CA          2303755          10/2001

OTHER PUBLICATIONS

IBM, et al.,"Single Element Fiber Optic to Fiber Optic Coupler", ip.com, May 1982, pp. 1-3.

* cited by examiner

*Primary Examiner* — Don N Vo
(74) *Attorney, Agent, or Firm* — Tutunjian & Bitetto, P.C.; Jeff LaBaw

(57) ABSTRACT

A method and fiber optic coupling system are provided. The method includes establishing that a physical coupling has occurred between a fiber optic cable and a fiber optic Small Form-factor Pluggable (SFP). The fiber optic cable includes a cable magnetic connector. The fiber optic SFP includes a SFP magnetic connector having a plurality of magnetic switches. The fiber optic SFP is operably coupled to a SFP circuit board, an emitter, and a receiver. The method further includes determining that the cable magnetic connector has applied a magnetic field to the plurality of magnetic switches. The method further includes activating the emitter and the receiver, responsive to the magnetic field being applied to the plurality of magnetic switches.

20 Claims, 7 Drawing Sheets

| Pin | Name | Function |
| --- | --- | --- |
| 1 | VeeT | Transmitter ground |
| 2 | TxFault | Transmitter fault indication |
| 3 | TxDisable | Optical output disabled when high |
| 4 | MOD-DEF(2) | Data for serial ID interface |
| 5 | MOD-DEF(1) | Clock for serial ID interface |
| 6 | MOD-DEF(0) | Grounded by the module to indicate module presence |
| 7 | RateSelect | Low selects reduced bandwidth |
| 8 | LOS | When high, indicates received optical power below worst-case receiver sesitivity |
| 9 | VeeR | Receiver ground |
| 10 | VeeR | Receiver ground |
| 11 | VeeR | Receiver ground |
| 12 | RD- | Inverted received data |
| 13 | RD+ | Received data |
| 14 | VeeR | Receiver ground |
| 15 | VccR | Receiver power (3.3V, max. 300mA) to Reed Switch A |
| 16 | VccT | Transmitter power (3.3V, max. 300mA) to Reed Switch B |
| 17 | VeeT | Transmitter ground |
| 18 | TD+ | Transmit data |
| 19 | TD- | Inverted transmit data |
| 20 | VeeT | Transmitter ground |
| 21 | VccR | Reed Switch A output Receiver power (3.3 V,max. 300mA) to Receiver module |
| 22 | VccT | Reed Switch B output Transmitter power (3.3 V,max. 300mA) to Transmitter module |

FIG. 6

NETWORK FIBER OPTIC CABLE CONNECTOR WITH MAGNETIC CONTACTS

BACKGROUND

Technical Field

The present invention relates generally to networks and, in particular, to a network fiber optic cable connector with magnetic contacts.

Description of the Related Art

Current network fiber optic connectors do not detect if a cable connection is complete before the emitter (laser) and receiver (photo detector) are turned on. The emitter and receiver are always on, as well as a pairing device. Once a connector is in the process of getting plugged in, there is a time in which the laser source may cause the receiver to detect multiple up and down state changes due to the source of light not being stable in the connection. The false positive may cause the software on the pairing device to create a false link propagation state which, in turn, will cause connection issues and possible link flaps.

SUMMARY

According to an aspect of the present invention, a method is provided. The method includes establishing that a physical coupling has occurred between a fiber optic cable and a fiber optic Small Form-factor Pluggable (SFP). The fiber optic cable includes a cable magnetic connector. The fiber optic SFP includes a SFP magnetic connector having a plurality of magnetic switches. The fiber optic SFP is operably coupled to a SFP circuit board, an emitter, and a receiver. The method further includes creating a magnetic field. The magnetic field is created by magnetically coupling the cable magnetic connector with the SFP magnetic connector. The method further includes activating the emitter and the receiver, responsive to the magnetic field being applied to the plurality of magnetic switches.

According to another aspect of the present invention, a fiber optic coupling system is provided. The fiber optic coupling system includes a fiber optic cable that, in turn, includes a cable magnetic connector. The fiber optic coupling system further includes a fiber optic Small Form-factor Pluggable (SFP), operably coupled to a SFP circuit board, an emitter, and a receiver. The fiber optic SFP includes a SFP magnetic connector having a plurality of magnetic switches. The cable magnetic connector and the SFP magnetic connector are configured to apply a magnetic field to the plurality of magnetic switches when coupled together. The SFP circuit board is configured to activate the emitter and the receiver, responsive to the magnetic field being applied to the plurality of magnetic switches.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein:

FIG. 6 shows exemplary an exemplary table listing functions associated with the pins of the bus of FIG. 5, in accordance with an embodiment of the present invention.

DETAILED DESCRIPTION

The present invention is directed to a network fiber optic cable connector with magnetic contacts.

In an embodiment, the present invention involves a fiber optic cable with a magnetic connector and a fiber optic Small Form-factor Pluggable (SFP) with a magnetic connector. The fiber optic cable is associated with a receiver. When the magnetic connectors (of the fiber optic cable and the fiber optic SFP) are plugged into each other, a circuit that functions as a switch is completed. The circuit will then turn on an emitter (e.g., a laser) and the receiver (e.g., a photodetector), since an initial known state has been established. Thus, the present invention minimizes (i) false positives on a fiber optic initial connection and (ii) nested link state changes, resulting from a misconnection of a fiber optic cable port at initial plug in. Hence, link flap errors can be avoided or at least minimized by the present invention.

In an embodiment, the present invention employs a magnetic switch (e.g., a reed switch) to allow stability of (i) link propagation and (ii) a known state at the initial connection of a fiber optic cable into the partnering fiber optic SFP of a network system. The present invention also lowers the amount of energy consumption by the emitter and the receiver since the emitter and receiver are only turned on when the fiber optic cable is plugged into the SFP.

Figure 1:
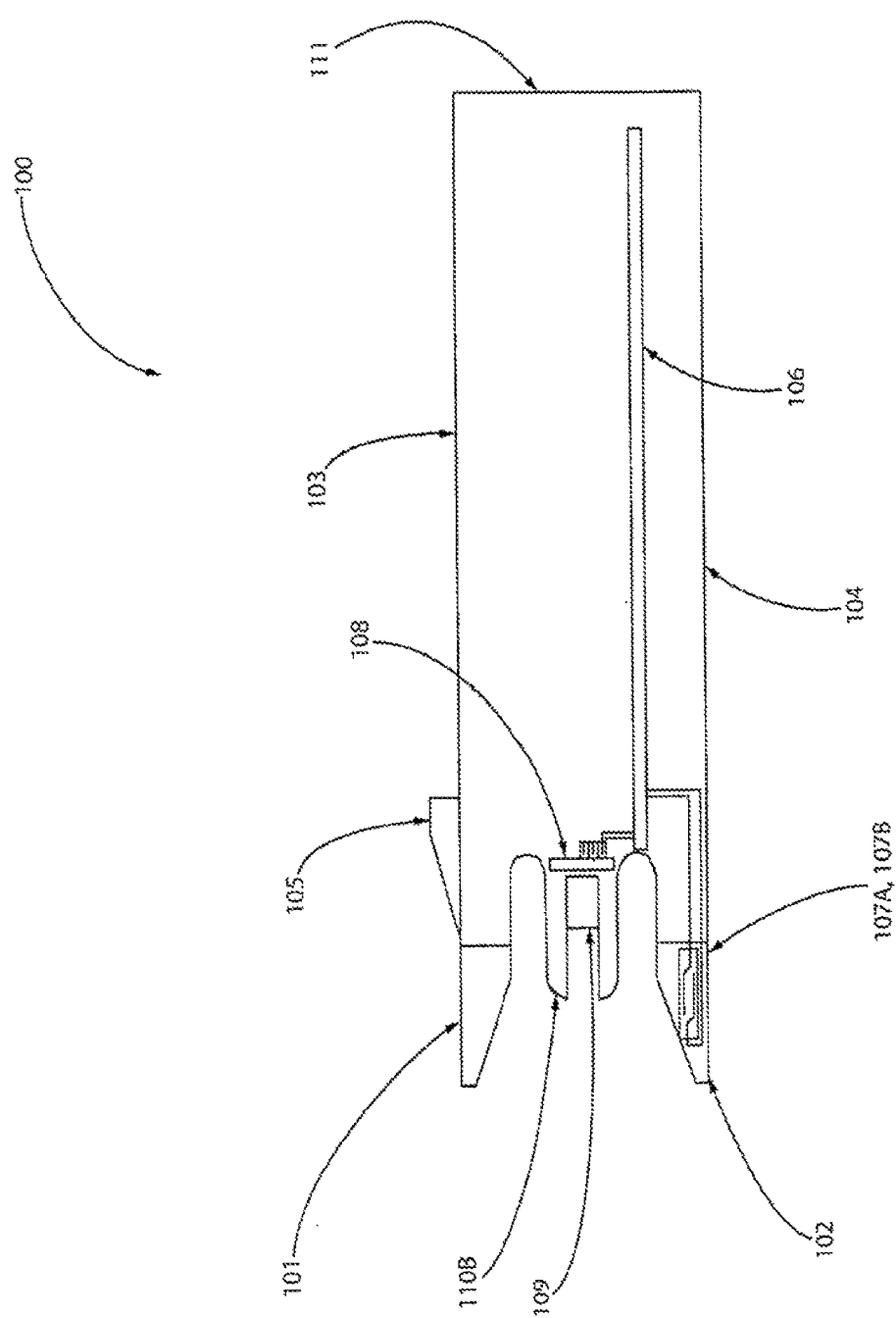
FIG. 1 shows a side view of an exemplary fiber optic Small Form-factor Pluggable (SFP), in accordance with an embodiment of the present invention.
Figure 2:
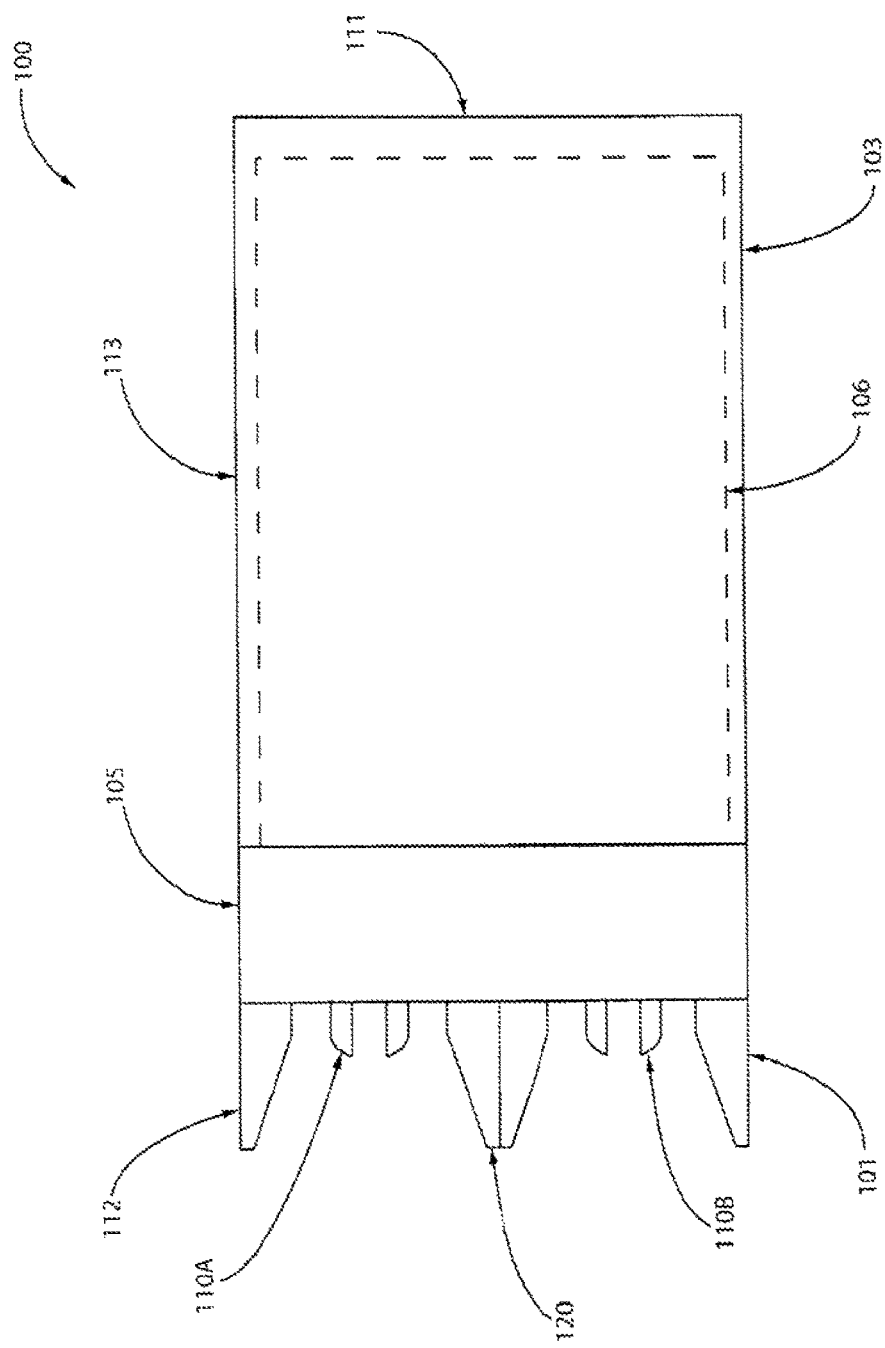
FIG. 2 shows a top view of the fiber optic SFP of FIG. 1, in accordance with an embodiment of the present principles.

FIG. 1 shows a side view of an exemplary fiber optic Small Form-factor Pluggable (SFP) 100, in accordance with an embodiment of the present invention. FIG. 2 shows a top view of the fiber optic SFP 100 of FIG. 1, in accordance with an embodiment of the present principles. The fiber optic SFP 100 has a magnetic connector switch design.

Referring to FIGS. 1 and 2, the fiber optic SFP 100 includes a non-magnetic metal casing 101, a non-magnetic metal casing 102, a non-magnetic metal casing 103, a non-magnetic metal casing 104, a SFP insert stopper 105, a fiber optic SFP circuit board 106, a reed switch 107A, a reed switch 107B, an emitter 108, a fiber optic cylinder 109, a fiber end receiving portion 110A, a fiber end receiving portion 110B, a non-magnetic metal casing 120, a non-magnetic metal casing 111, a non-magnetic metal casing 112, and a non-magnetic metal casing 113. It is to be appreciated that while essentially being implemented as a single component, the non-magnetic metal casings 120, 111, 112, and 113 use different reference numerals in consideration of their respective different spatial locations in order to better identify these elements across the various views.

Figure 5:
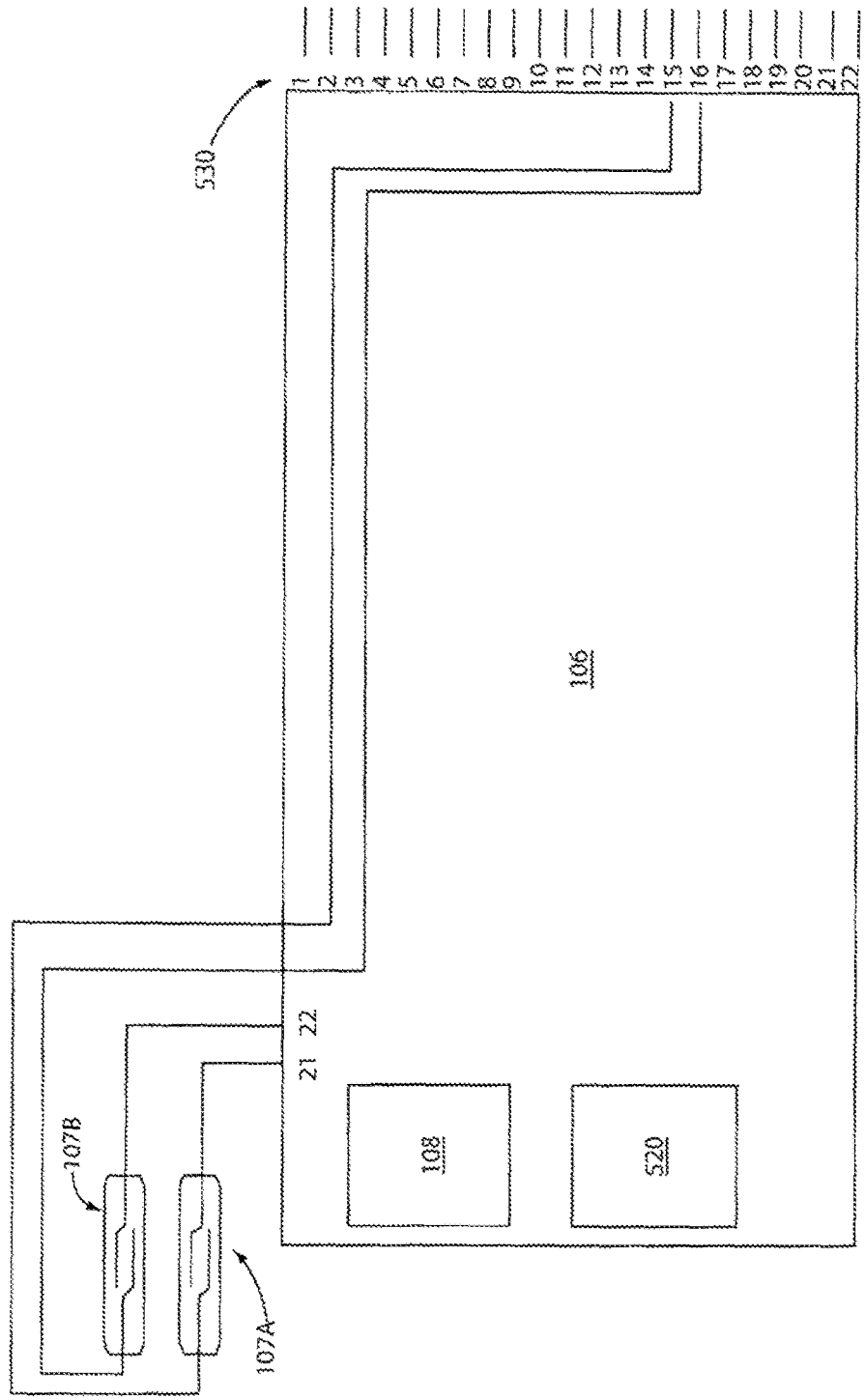
FIG. 5 further shows the fiber optic SFP circuit board of FIGS. 1 and 2, modified to support a magnetic switch, in accordance with an embodiment of the present invention.

The emitter 108 is operably coupled to (and can be part of) the fiber optic SFP circuit board 106. A receiver 520, shown in FIG. 5, is also operably coupled to (and can be part of) the fiber optic SFP circuit board 106. The reed switch 107A and reed switch 107B are operably coupled to (and can be part of) the fiber optic SFP circuit board 106.

Figure 3:
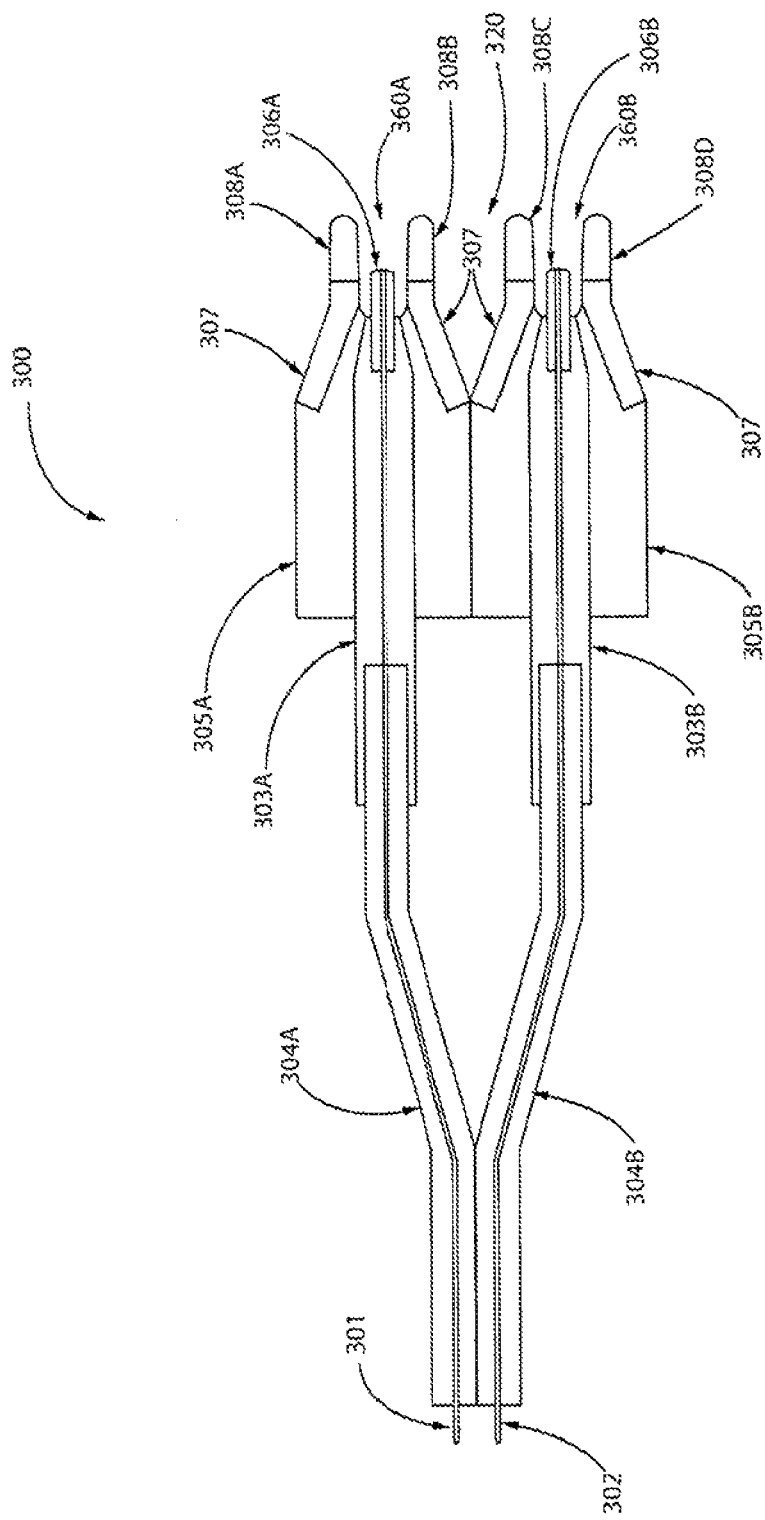
FIG. 3 shows a top view of an exemplary fiber optic cable, in accordance with an embodiment of the present invention.
Figure 4:
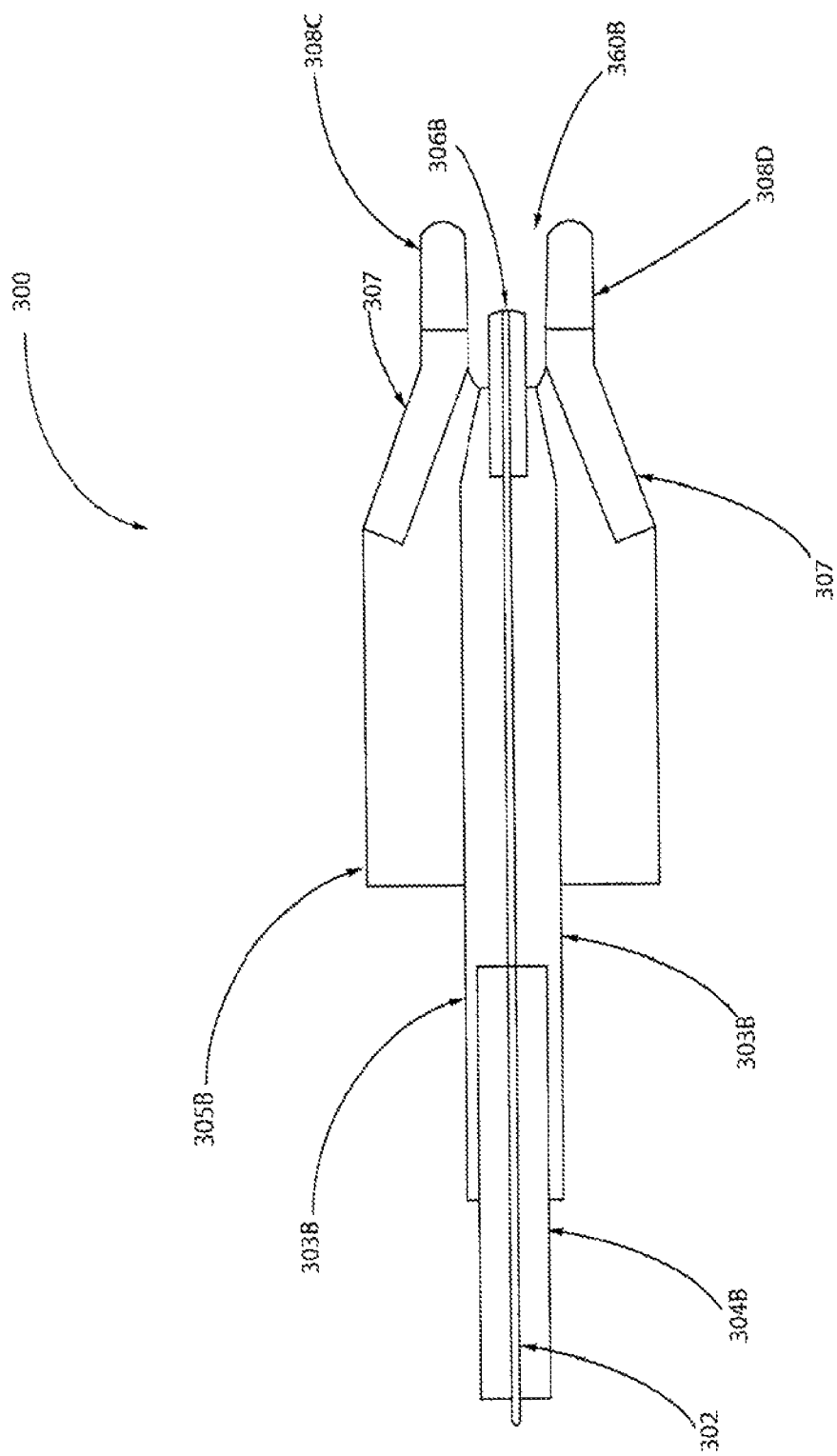
FIG. 4 shows a side view of the fiber optic cable of FIG. 3, in accordance with an embodiment of the present principles.

FIG. 3 shows a top view of an exemplary fiber optic cable 300, in accordance with an embodiment of the present invention. FIG. 4 shows a side view of the fiber optic cable 300 of FIG. 3, in accordance with an embodiment of the present principles. The fiber optic cable 300 has a magnetic connector switch design. The fiber optic cable 300 is configured to couple to the fiber optic SFP 100 of FIGS. 1 and 2.

Referring to FIGS. 3 and 4, the fiber optic cable 300 includes a fiber 301, a fiber 302, a non-bendable rubber cable enclosure 303A, a non-bendable rubber cable enclosure 303B, a bendable rubber cable enclosure 304A, a bendable rubber cable enclosure 304B, a hard plastic enclosure 305A, a hard plastic enclosure 305B, a hard non-bendable plastic enclosure 306A, a hard non-bendable plastic enclosure 306B, magnetic material 307, a hard non-bendable plastic portion 308A, a hard non-bendable plastic portion 308B, a hard non-bendable plastic portion 308C, and a hard non-bendable plastic portion 308D.

In further detail regarding FIGS. 3 and 4, the hard non-bendable plastic enclosure 306A encloses part (an end part) of fiber 301, and the hard non-bendable plastic enclosure 306B encloses part (an end part) of fiber 302. The hard plastic enclosure 305A encloses part (an end part) of fiber 301 and part (an end part) of the non-bendable rubber cable enclosure 303A, and includes the hard non-bendable plastic enclosures 308A-B. The hard plastic enclosure 305B encloses part (an end part) of fiber 302 and part (an end part) of the non-bendable rubber cable enclosure 303B, and includes the hard non-bendable plastic enclosures 308C-D and the magnetic material 307.

Referring to, e.g., FIGS. 1 and 4, the magnetic material 307 is positioned so as to be adjacent the reed switch 107A and the reed switch 107B when the fiber optic cable 300 is operably coupled to the fiber optic SFP 100.

Referring to FIGS. 1 and 3, when connecting the fiber optic SFP 100 to the fiber optic cable 300, the hard non-bendable plastic enclosure 306A (of the fiber optic cable 300) fits within the fiber end receiving portion 110A (of the fiber optic SFP 100) which, in turn fits within a cavity 360A formed between hard non-bendable plastic portion 308A and hard non-bendable plastic portion 308B. Also when connecting the fiber optic SFP 100 to the fiber optic cable 300, the hard non-bendable plastic enclosure 306B (of the fiber optic cable 300) fits within the fiber end receiving portion 110B (of the fiber optic SFP 100) which, in turn fits within a cavity 360B formed between hard non-bendable plastic portion 308C and hard non-bendable plastic portion 308D. Further when connecting the fiber optic SFP 100 to the fiber optic cable 300, the metal casing 120 fits within a cavity 320 formed between hard non-bendable plastic portion 308B and hard non-bendable plastic portion 308C. Additionally when connecting the fiber optic SFP 100 to the fiber optic cable 300, the magnetic material 107 of the fiber optic cable 300 (e.g., as shown in FIG. 3) connects to the non-magnetic metal casings 112, 120, and 101 (e.g., as shown in FIG. 2). When the fiber optic SFP 100 is operably connected to the fiber optic cable 300 in the preceding manner, the reed switch 107A and the reed switch 107B are spatially adjacent the magnetic material 307 in order to complete a circuit on the fiber optic SFP circuit board 106, thus turning on the emitter 108 and the receiver 520. In this way, the emitter 108 and the receiver 520 are only powered the fiber optic SFP 100 and the fiber optic cable 300 are connected in the aforementioned manner.

A fiber optic SFP circuit board modification to support a magnetic switch will now be described, in accordance with an embodiment of the present invention.

FIG. 5 further shows the fiber optic SFP circuit board 106 of FIGS. 1 and 2, modified to support a magnetic switch, in accordance with an embodiment of the present invention. For the sake of clarity and brevity, not all of the elements of fiber optic SFP circuit board 106 are shown. In the embodiment of FIG. 5, the fiber optic circuit board 106 includes an emitter 108, a receiver 520, and a bus 530, and is operably coupled to the two reed switches 107A and 107B.

The fiber optic SFP circuit board 106 itself is configured to comply with the Fiber SFP standard that supports many current fiber optic based network systems. In accordance with an embodiment, the fiber optic SFP circuit board 106 is modified to include (and/or interact with) two reed switches 107A and 107B to decrement the number of false positives that could occur at an initial plug in of the fiber optic cable (e.g., fiber optic cable 300 of FIGS. 3 and 4) into the fiber optic SFP (e.g., SFP 100 of FIGS. 1 and 2).

The magnetic material (e.g., magnetic material 307 in FIG. 3) of the fiber optic cable connector will allow the two reed switches 107A and 107B to close when connected, which will cause power to flow into the emitter 108 and receiver 520. When a disconnect occurs and the magnets of the cable connector are moved away, then the reed switches 107A and 107B will stop power from getting to the emitter 106 and receiver 520.

FIG. 6 shows exemplary an exemplary table 600 listing functions associated with the pins of bus 530 of FIG. 5, in accordance with an embodiment of the present invention.

The table 6 includes a column 601, a column 602, and a column 603. Column 601 corresponds to a pin number, column 602 corresponds to a function name, and column 603 corresponds to a function. As can be seen, some of the pins relate to the use of the reed switches 107A and 107B in order to implement the present invention.

Figure 7:
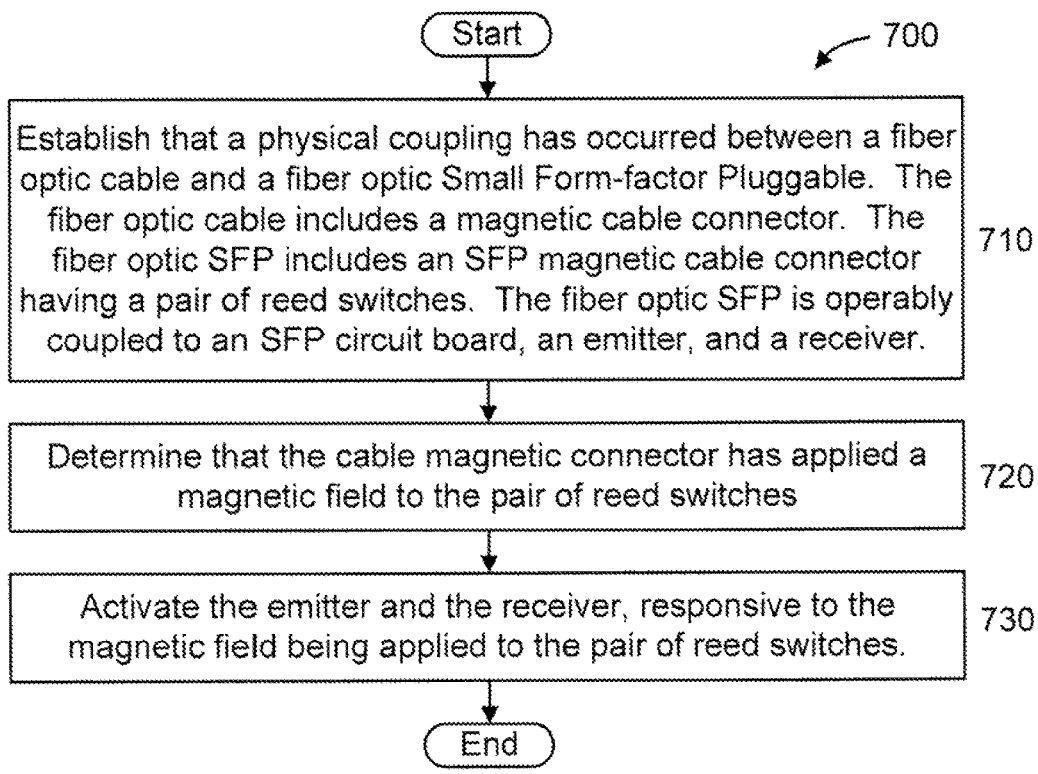
FIG. 7 shows an exemplary method for fiber optic coupling, in accordance with an embodiment of the present invention.

FIG. 7 shows an exemplary method 700 for fiber optic coupling, in accordance with an embodiment of the present invention. In an embodiment, method 700 involves the fiber optic cable 300 of FIGS. 3 and 4, and the fiber optic Small Form-factor Pluggable (SFP) 100 of FIGS. 1 and 2, At step 710, establish that a physical coupling has occurred between a fiber optic cable and a fiber optic Small Form-factor Pluggable. The fiber optic cable includes a magnetic cable connector. The fiber optic SFP includes a SFP magnetic cable connector having a pair of reed switches. The fiber optic SFP is operably coupled to a SFP circuit board, an emitter, and a receiver.

At step 720, determine that the cable magnetic connector has applied a magnetic field to the pair of reed switches.

At step 730, activate the emitter and the receiver, responsive to the magnetic field being applied to the pair of reed switches.

It is to be appreciated that while one or more embodiments of the present invention are described as involving reed switches, the present invention is not limited to the same and, thus, any type of magnetic switch can be used while maintaining the spirit of the present invention. That is, any type of electrical switch operated by a magnetic field can be used while maintaining the spirit of the present invention.

Hence, a substitute for a reed switch can include, but is not limited to, the combination of a magnetic sensor and an electrical switch. In an embodiment, the present invention employs one magnetic switch per fiber port at a minimum, although more than one magnetic switch per fiber port can also be used.

Moreover, it is to be appreciated that while one or more embodiments of the present invention are described specifying certain materials (metal, plastic, etc.) and/or certain material attributes (e.g., bendable, non-bendable, etc.) for certain portions of the fiber optic SFP 100 and the fiber optic cable 300, the present invention is not limited to the same in order to implement the present invention, as readily appreciated by one of ordinary skill in the art given the teachings of the present principles provided herein. Thus, other materials and/or other material attributes can be used for the elements of the present invention, while maintaining the spirit of the present invention.

Further, it is to be appreciated that while one or more embodiments of the present invention describe some elements as separate elements (e.g., but not limited to, hard plastic enclosure 305A and hard plastic enclosure 305B), such elements can also be implemented as a single element, while maintaining the spirit of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
    establishing that a physical coupling has occurred between a fiber optic cable and a fiber optic Small Form-factor Pluggable (SFP), wherein the fiber optic cable includes a cable magnetic connector, wherein the fiber optic SFP includes a SFP magnetic connector having a plurality of magnetic switches, and wherein the fiber optic SFP is operably coupled to a SFP circuit board, an emitter, and a receiver;
    determining that the cable magnetic connector has applied a magnetic field to the plurality of magnetic switches; and
    activating the emitter and the receiver, responsive to the magnetic field being applied to the plurality of magnetic switches.

2. The method of claim 1, wherein said activating step changes a power state of the emitter and the receiver from unpowered to powered.

3. The method of claim 2, wherein the emitter and the receiver are configured to normally remain in the unpowered state, in an absence of applying the magnetic field to the plurality of magnetic switches.

4. The method of claim 1, further comprising deactivating the emitter and the receiver, by removing the magnetic field from the plurality of magnetic switches.

5. The method of claim 1, wherein the plurality of magnetic switches are configured to minimize false positives at an initial plug in of the fiber optic cable into the fiber optic SFP.

6. The method of claim 5, wherein the false positives are minimized based on a circuit state that is selectively controlled responsive to an existence or an absence of the magnetic field being applied to the plurality of magnetic switches.

7. The method of claim 1, wherein the magnetic field is applied to the plurality of magnetic switches to automatically activate the emitter and the receiver responsive to magnetically coupling the cable magnetic connector with the SFP magnetic connector.

8. The method of claim 1, further comprising reducing respective power consumptions of the emitter and the receiver by deactivating the emitter and the receiver, responsive to uncoupling the fiber optic cable and the fiber optic SFP so as to remove the magnetic field from the plurality of magnetic switches.

9. A fiber optic coupling system, comprising:
    a fiber optic cable including a cable magnetic connector, and
    a fiber optic Small Form-factor Pluggable (SFP), operably coupled to a SFP circuit board, an emitter, and a receiver, and including a SFP magnetic connector having a plurality of magnetic switches,
    wherein the cable magnetic connector and the SFP magnetic connector are configured to apply a magnetic field to the plurality of magnetic switches when coupled together; and
    wherein the SFP circuit board is configured to activate the emitter and the receiver, responsive to the magnetic field being applied to the plurality of magnetic switches.

10. The fiber optic coupling system of claim 9, wherein a magnetic coupling between the cable magnetic connector and the SFP magnetic connector is established responsive to an establishment of a physical coupling between the fiber optic cable and the fiber optic SFP.

11. The fiber optic coupling system of claim 9, wherein the SFP circuit board changes a power state of the emitter and the receiver from unpowered to powered, responsive to the magnetic field being applied to the plurality of magnetic switches.

12. The fiber optic coupling system of claim 11, wherein the emitter and the receiver are configured to normally remain in the unpowered state, in an absence of the magnetic field being applied to the plurality of magnetic switches.

13. The fiber optic coupling system of claim 9, wherein the SFP circuit board is further configured to deactivate the emitter and the receiver, responsive to a removal of the magnetic field from the plurality of magnetic switches.

14. The fiber optic coupling system of claim 13, wherein the removal of the magnetic field from the plurality of magnetic switches is achieved by disestablishing a physical coupling between the fiber optic cable and the fiber optic SFP.

15. The fiber optic coupling system of claim 9, wherein the plurality of magnetic switches are configured to minimize false positives at an initial plug in of the fiber optic cable into the fiber optic SFP.

16. The fiber optic coupling system of claim 15, wherein the false positives are minimized based on a circuit state that is selectively controlled responsive to an existence or an absence of the magnetic field being applied to the plurality of magnetic switches.

17. The fiber optic coupling system of claim 9, wherein a casing portion of the fiber optic SFP adjacent to the plurality of magnetic switches is non-magnetic, and wherein another casing portion of the fiber optic SFP, directly opposing the casing portion adjacent to the plurality of magnetic switches, is magnetic.

18. The fiber optic coupling system of claim 9, wherein the plurality of magnetic switches are configured to minimize link flap errors at an initial plug in of the fiber optic cable into the fiber optic SFP, based on a circuit state that is selectively controlled responsive to an existence or an absence of the magnetic field being applied to the plurality of magnetic switches.

19. The fiber optic coupling system of claim 9, wherein the plurality of magnetic switches are reed switches.

20. The fiber optic coupling system of claim 9, wherein the fiber optic SFP comprises the SFP circuit board, the emitter, and the receiver.

\* \* \* \* \*